United States Patent [19]
Silverstein et al.

[11] Patent Number: 5,790,071
[45] Date of Patent: Aug. 4, 1998

[54] METHOD FOR DETERMINING ORIENTATION AND ATTITUDE OF A SATELLITE- OR AIRCRAFT-BORNE PHASED-ARRAY ANTENNA

[75] Inventors: Seth David Silverstein, Schenectady; Jeffrey Michael Ashe, Gloversville; Gregory Michael Kautz, Burnt Hills; Frederick Wilson Wheeler, Troy, all of N.Y.; Anthony Wykeham Jacomb-Hood, Yardley, Pa.

[73] Assignee: Lockheed Martin Corp., Sunnyvale, Calif.

[21] Appl. No.: 887,691

[22] Filed: Jul. 3, 1997

[51] Int. Cl.$^6$ .................................................. H04B 7/185
[52] U.S. Cl. ........................... 342/354; 342/372; 342/373
[58] Field of Search ................................. 342/354, 372, 342/373

[56] References Cited

U.S. PATENT DOCUMENTS 5,355,138  10/1994  Cances et al. ........................ 342/354
5,400,036  3/1995  Kochiyama et al. ................... 342/370
5,697,050  12/1997  Wiedeman .......................... 455/12.1

*Primary Examiner*—Theodore M. Blum
*Attorney, Agent, or Firm*—W. H. Meise; S. A. Young; L. B. Wegemer

[57] ABSTRACT

A Tripulse method determines the orientation or attitude of a phased-array antenna located at a remote site, such as an aircraft or spacecraft. Three pulses are transmitted from the phased-array antenna in an estimated direction toward a coherent receiver, with a sum beam, and with first and second difference beams formed by reversal of the phase of certain elements above a first axis of symmetry, and to one side of a second axis of symmetry. The received signals are processed in a manner which determines the error between the assumed direction and the actual direction of the receiver. To determine the rotational position of the array antenna, the same steps are performed for a second remote receiver, and additional processing determines the complete attitude, including yaw, of the phased-array antenna. The coherent receiver may use the first transmitted pulse as a reference, or it may use a separate reference signal.

6 Claims, 7 Drawing Sheets

5,790,071

1

METHOD FOR DETERMINING ORIENTATION AND ATTITUDE OF A SATELLITE- OR AIRCRAFT-BORNE PHASED-ARRAY ANTENNA

FIELD OF THE INVENTION

This invention relates to measurement arrangements for determining the orientation and attitude of phased-array antennas, and more particularly to such measurements as applied to phased-array antennas mounted on moving vehicles, such as aircraft or spacecraft.

BACKGROUND OF THE INVENTION

A phased array antenna communication satellite system can require a higher degree of pointing accuracy than that which can be obtained using Earth-Moon and sun sensors. Accurate attitude determination is an important factor in issues of delivering maximum signal power to localized areas, and also in allowing for maximum frequency reuse with minimal interference. Earth-Moon-Sun sensor systems typically provide an attitude accuracy on the order of 0.1\deg. More sophisticated systems that include star sensors can improve the attitude accuracy to about 0.05\deg. These highly accurate conventional systems are costly because of their improved sensitivity, and are more costly to launch than less accurate sensor systems, because of increased sensor weight. Even if the cost and weight of conventional attitude sensors are acceptable, their overall accuracy may not be sufficient.

Improved attitude determining arrangements are desired.

SUMMARY OF THE INVENTION

A method according to the invention determines, from measurements made at a remote first receiver, at least the orientation of the first receiver relative to the local coordinate system of a remote phased-array antenna. In a particular embodiment of the invention, the phased-array antenna is located on an aerospace vehicle such as an aircraft or a spacecraft, and the first receiver is terrestrial. The phased-array antenna has first and second axes of symmetry which are mutually orthogonal, and orthogonal to the boresight. The antenna includes a plurality of individual antenna elements, and also includes a beamformer capable of controlling the phase of the signals applied to the various individual antenna elements. The method according to the invention includes a plurality of steps. The steps include estimating the orientation of the first receiver relative to the local coordinate system of the phased-array antenna, which may be derived, for example, from coarse knowledge of the vehicle attitude and the physical orientation of the antenna on the vehicle. The phase shifters of the beamformer are set to three different conditions when the method is performed; these settings may be made in time sequence. The phase shifters of the beamformer are set to a first sum-beam condition which provides a planar wavefront having a normal directed toward the estimated location of the first receiver. With the phase shifters set to the first sum-beam condition, at least a first pulse signal is transmitted toward the first receiver. The pulse signal may be a pulse set, if desired. The phase shifters of the beamformer are set to a first delta-beam condition, in which the phase shifters associated with those of the antenna elements on a first side of the first axis of symmetry have the first sum-beam phase-shift or condition, and those of the phase shifters associated with those of the antenna elements on a second side of the first axis of symmetry have the first sum-beam phase-shift or

2 condition plus 180°. With the phase shifters of the beamformer set to the first delta-beam condition, at least a second pulse signal is transmitted toward the first receiver. The phase shifters of the beamformer are set to a second delta-beam condition, in which the phase shifters associated with those of the antenna elements on a first side of the second axis of symmetry have the first sum-beam phase-shift or condition, and those of the phase shifters associated with those of the antenna elements on a second side of the second axis of symmetry have the first sum-beam phase shift or condition, plus 180°. With the phase shifters of the beamformer set to the second delta-beam condition, at least a third pulse signal is transmitted toward the first receiver. The first pulse signal is received at the first receiver, and the amplitude and phase of the first pulse signal are extracted, relative to a reference signal. The reference signal may be derived from any one of the first, second and third pulse signals. The second pulse signal is received at the first receiver, and the amplitude and phase of the second pulse signal are extracted relative to the reference signal. The third pulse signal is received at the first receiver, and the amplitude and phase of the third pulse signal are extracted relative to the reference signal. A first ratio is formed representing the ratio of the complex amplitude of the first delta beam divided by the first sum beam. A second ratio is formed representing the ratio of the complex amplitude of the second delta beam divided by the first sum beam.

From the first and second ratios, the error in the initial estimate of the orientation of the receiver is determined, relative to the local coordinate system of the phased-array antenna. This error in the initial estimate, together with the initial estimate of the position of the first receiver relative to the boresight, allows determination of a refined estimate of the actual orientation of the receiver relative to the local coordinate system of the phased-array antenna.

In a particular embodiment of the invention, the above-described method is enhanced by further steps, which allow the determination of the full attitude of the phased-array antenna. These further steps include estimating the orientation of a second receiver, at a different location than the first receiver, relative to the local coordinate system of the phased-array antenna. The phase shifters of the beamformer are set to a second sum-beam condition which provides a planar wavefront having a normal directed toward the second receiver, based on the estimate of the location of the second receiver. With the phase shifters set to the second sum-beam condition, at least a fourth pulse signal is transmitted toward the second receiver. The phase shifters of the beamformer are set to a third delta-beam condition. The third delta-beam condition is one in which the phase shifters associated with the antenna elements on the first side of the first axis of symmetry have the second sum-beam condition or phase-shift, and the phase shifters associated with the antenna elements on a second side of the first axis of symmetry have the second sum-beam condition or phase shift, plus 180°. With the phase shifters of the beamformer set to the third delta-beam condition or phase-shift, at least a fifth pulse signal is transmitted toward the second receiver. The phase shifters of the beamformer are set to a fourth delta-beam condition, in which the phase shifters associated with the antenna elements on a first side of the second axis of symmetry have the second sum-beam phase-shift or condition, and the phase shifters associated with those of the antenna elements on the other or second side of the second axis of symmetry have the second sum-beam condition or phase shift, plus 180°. With the phase shifters of beamformer set to the fourth condition, at least a sixth pulse signal is transmitted toward the second receiver. The fourth pulse signal is received at the second receiver, and the amplitude and phase of the fourth pulse signal are extracted relative to a second reference signal. The second reference signal may be derived from one of the fourth, fifth, or sixth pulse signals. The fifth pulse signal is received at the second receiver, and the amplitude and phase of the fifth pulse signal are extracted relative to the second reference signal. The sixth pulse signal is received at the second receiver, and the amplitude and phase of the sixth pulse signal are extracted relative to the second reference signal. A third ratio is formed, representing the ratio of the complex amplitude of the third delta beam to the second sum beam. A fourth ratio is formed, representing the ratio of the complex amplitude of the fourth delta beam to the second sum beam. From the third and fourth ratios, the error in the initial estimate of the orientation of the second receiver relative to the local coordinate system of the phased-array antenna is determined. Then, from the known locations of the first and second receivers in a coordinate frame, and from the known errors in the initial estimates of the orientation of the first and second receivers relative to the local coordinate system of the array antenna, the three-dimensional position or attitude of the boresight of the antenna array is determined relative to the coordinate frame of the receivers.

BRIEF DESCRIPTION OF THE DRAWINGS

FIG. 2 is a simplified diagram, in block and schematic form, of details of the transmitter and beamformer of the spacecraft of FIG. 1a;

FIG. 3 is a simplified diagram, in block and schematic form, of a coherent detector or receiver which may be located at the first ground station of FIG. 1a;

DESCRIPTION OF THE INVENTION

This invention, in general, relates to an orientation estimation system, which may be termed a "Tripulse" system, which accurately estimates the orientation, and more generally the attitude, of a satellite-borne phased array antenna, relative to one or more Earth stations. A system control computer, which may be located at ground station control, is programmed in accordance with an aspect of the invention to provide attitude estimates of the attitude of the satellite phased array, using as input information a combination of orbital data coupled with Tripulse orientation data, preferably obtained from two or more ground stations. The term "attitude," in this context, refers to the orientation of the array coordinate system relative to an inertial frame of reference or to the roll, pitch, and yaw axes, as defined for satellites in earth-bound orbits. The tripulse estimation process starts with a reasonably good initial orientation estimate, such as that which can be obtained using conventional spacecraft attitude measurement systems. Using the initial estimate as the starting point, the tripulse system has the capability, at least in principle, of increasing the accuracy of the initial estimates by several orders of magnitude. This is important from a number of perspectives: first, it can provide the mission-required high accuracy attitude specifications; and second, the hardware sensors providing the initial estimates can be designed with a bias toward system cost rather than toward optimal performance.

The tripulse system is conceptually similar to amplitude comparison monopulse systems used in tracking radars. The tripulse system differs from a monopulse system in that the single pulse concept, for which the monopulse is named, cannot be used for the purpose of the invention. In tripulse, a minimum of three coherent pulses are used, but of course more may be used. Moreover, in a preferred embodiment of the invention, these coherent pulses are accompanied by one or more reference signals, which aid in coherent detection, to assure phase coherence between the three demodulated pulses. In the context of a phased-array antenna system mounted on a moving vehicle, such as an airplane or a spacecraft, the coherent detection system compensates for Doppler shifts due to the motion of the vehicle, and also compensates for phase noise effects arising from the lack of synchronization between the clocks on the satellite and on the ground station.

Figure 1A:
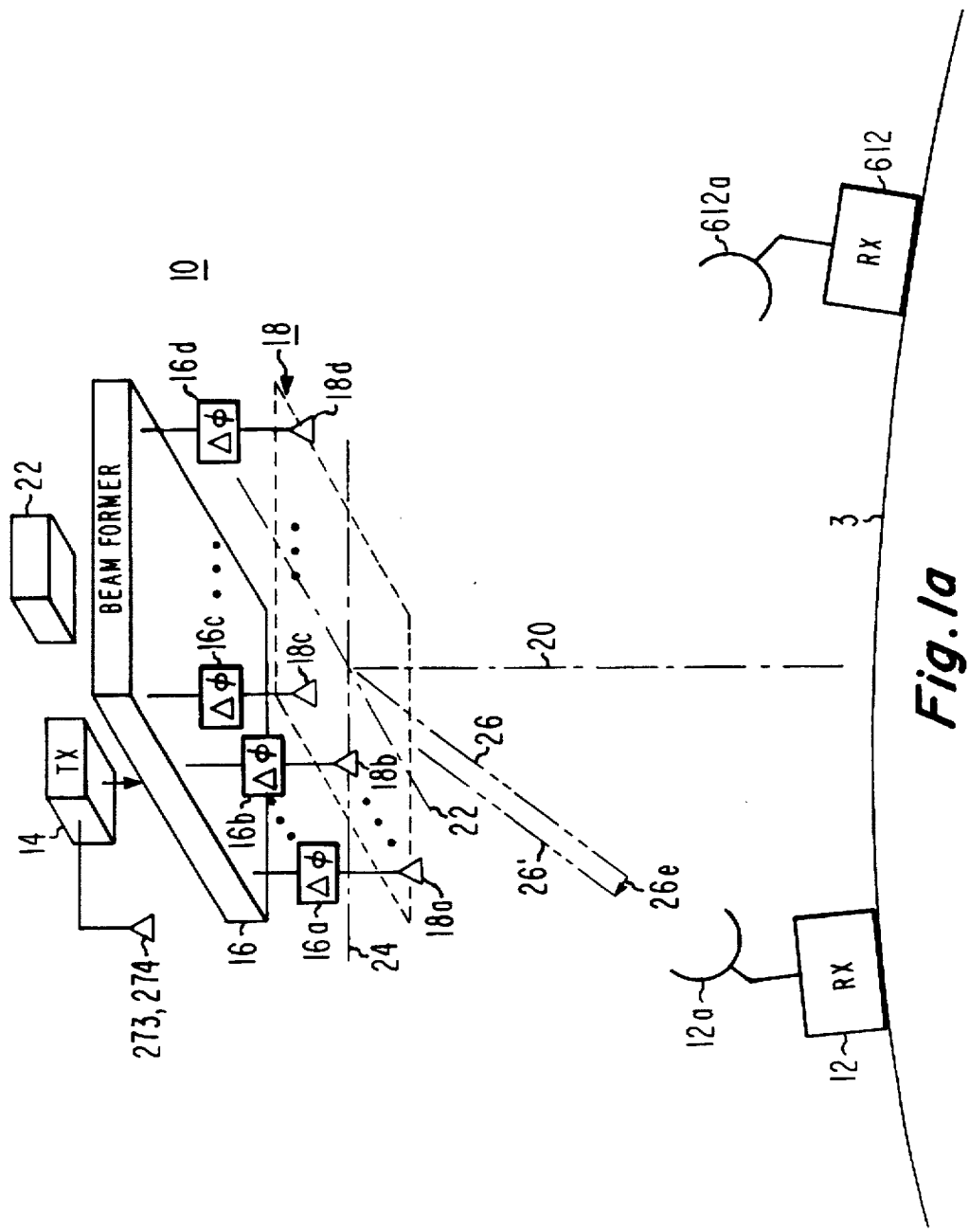
FIG. 1a is simplified diagram illustrating an aspect of the invention using a single ground station for performing determination of the orientation of the first receiver relative to the local coordinate system of the array antenna, and also illustrating a second ground station.
Figure 1B:
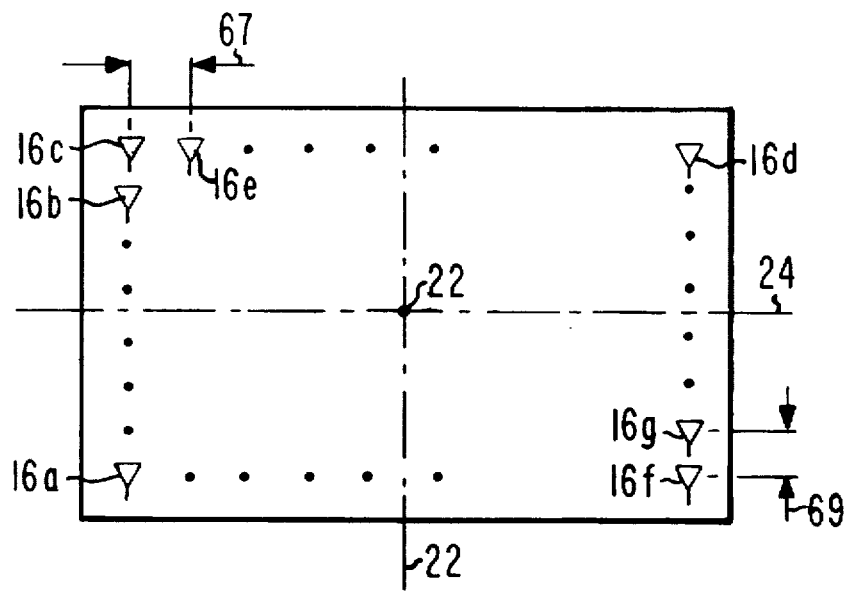
FIG. 1b represents a view of the antenna array of FIG. 1a looking along the boresight axis 20.

In FIG. 1a, a spacecraft 10 is in a geosynchronous or geostationary orbit about Earth 3. Spacecraft 10 includes a transmitter (TX) 14, a beamformer 16, an array of phase shifters ($\Delta\phi$), and a planar array 18 of antenna elements. In FIG. 1a, some of the members of the array of phase shifters are designated 16a, 16b, 16c, and 16d. Antenna array 18 includes elemental antennas 18a, 18b, 18c, and 18d, which are coupled to the phase shifters of array 16 having the corresponding letter suffix. The plane defined by antenna array 18 in turn defines a boresight axis or normal axis 20. Spacecraft 10 also includes an attitude control system, illustrated as a block 22, which may include horizon and sun sensors, with or without gyroscopes, which coacts with one or more torquers (not illustrated) to maintain a desired attitude of the spacecraft. As mentioned above, the attitude determination established by the attitude control system may be insufficiently accurate, so that the boresight of the antenna array is not in the desired direction. The antenna array 18 of FIG. 1a has a first axis of symmetry 22 and a second axis of symmetry 24, as illustrated in the view of FIG. 1b. FIG. 1b also illustrates the interelement spacing of the elemental antennas 16. More particularly, the interelement spacing in the horizontal direction is illustrated as the distance 67 between antenna elements 16c and 16e, while the vertical interelement spacing is illustrated by distance 69 between antenna elements 16f and 16g. Those skilled in the art know that the aperture of any array antenna may be partially filled, as a result of which the elements may be an integer multiple of the interelement spacing 67 or 69.

FIG. 1a also illustrates a terrestrial ground station 12, which communicates with spacecraft 10 by way of an antenna 12a. A line joining the center of the antenna array 18 and the coarse estimate of the location of ground station 12 is designated 26, and may be represented by unit vector components $T_{x0}$, $T_{y0}$, $T_{z0}$, along the x, y, and z axes, respectively. The x and y axes are in the plane of the array, and the z axis is normal to the plane of the array along the direction of the boresight axis. The ground station may be termed a "receiving" or "RX" station or a "receiver" because of its function in the system.

The phase shifters of array 16 are remotely controllable, as known in the art, by means of commands, which may be uplinked to the spacecraft 10 from the ground station 12 by means which are not illustrated.

In order to determine the error between the coarse estimate of the orientation of the ground station axis 26 and the actual orientation of the ground station axis 26', the first step is to determine, and store information, relating to the best available estimate of the direction of the ground station, in the form, for example, of two angles relative to the spacecraft attitude, known to the accuracy permitted by the spacecraft attitude sensors. The information may be stored at the spacecraft, at the ground station, or at the location at which the calculations will be performed, if different from these. Geometrical considerations allow the nominal known position of ground station 12 relative to the spacecraft antenna pointing direction to be determined, in the form of an "angle", or more specifically the projection of a unit vector onto the three axes of a Cartesian coordinate system. A line joining the origin of the local array coordinate system and the nominally known position of the ground station may be represented by unit vector components $T_{x0}$, $T_{y0}$, $T_{z0}$, along the x, y, and z axes, respectively.

It is now necessary to rotate the phase plane of the antenna 18 to direct radiated energy toward the ground station 12. If the array antenna 18 is gimballed to the spacecraft, the rotation may be physical, or if the antenna is not physically rotatable, the controllable phase-shifters of phase-shifter array 17 are shifted in a manner, well known in the art, to direct the beam toward the coarsely estimated direction to ground station 12. The phase plane of the antenna may be viewed as the locus of constant phase which is perpendicular to a line extending between the spacecraft antenna and the coarse estimate of the location of the ground station 12. It should be understood that this condition does not necessarily mean that all the phase shifters impart the same phase shift to their elemental antennas, because the phase shifters may also compensate for unavoidable phase differences between the feed structures of the elemental antennas.

With the array antenna 18, including its beamformer 16 and phase shifter array 17, adjusted to direct energy toward the ground station 12, a first pulse or pulse set is transmitted toward the ground station. Ultimately, this pulse set, and other pulse sets to be described, are coherently demodulated. The first of the pulses or pulse sets which is transmitted may itself provide a reference for the coherent detection of all the pulses, or separate reference signals may be transmitted in conjunction with, or previous to, the first pulse set.

In the context of a spacecraft, the movement of the spacecraft generates a Doppler time-dependent phase shift, which affects the coherent detection of the amplitude and phase (complex amplitude) of the transmitted pulse. The problem of Doppler shifts arises because the spacecraft velocity is not precisely known, but can be as large as one meter per second for a geostationary spacecraft. Since the phase shift is not precisely known, it cannot simply be subtracted out of the signal. At a frequency of 20 GHz., a velocity of one meter per second corresponds to up to about 67 wavelengths per second. Since coherent detection requires phase accuracies of about ten degrees, some way to correct for the Doppler shift must be used.

Figure 2:
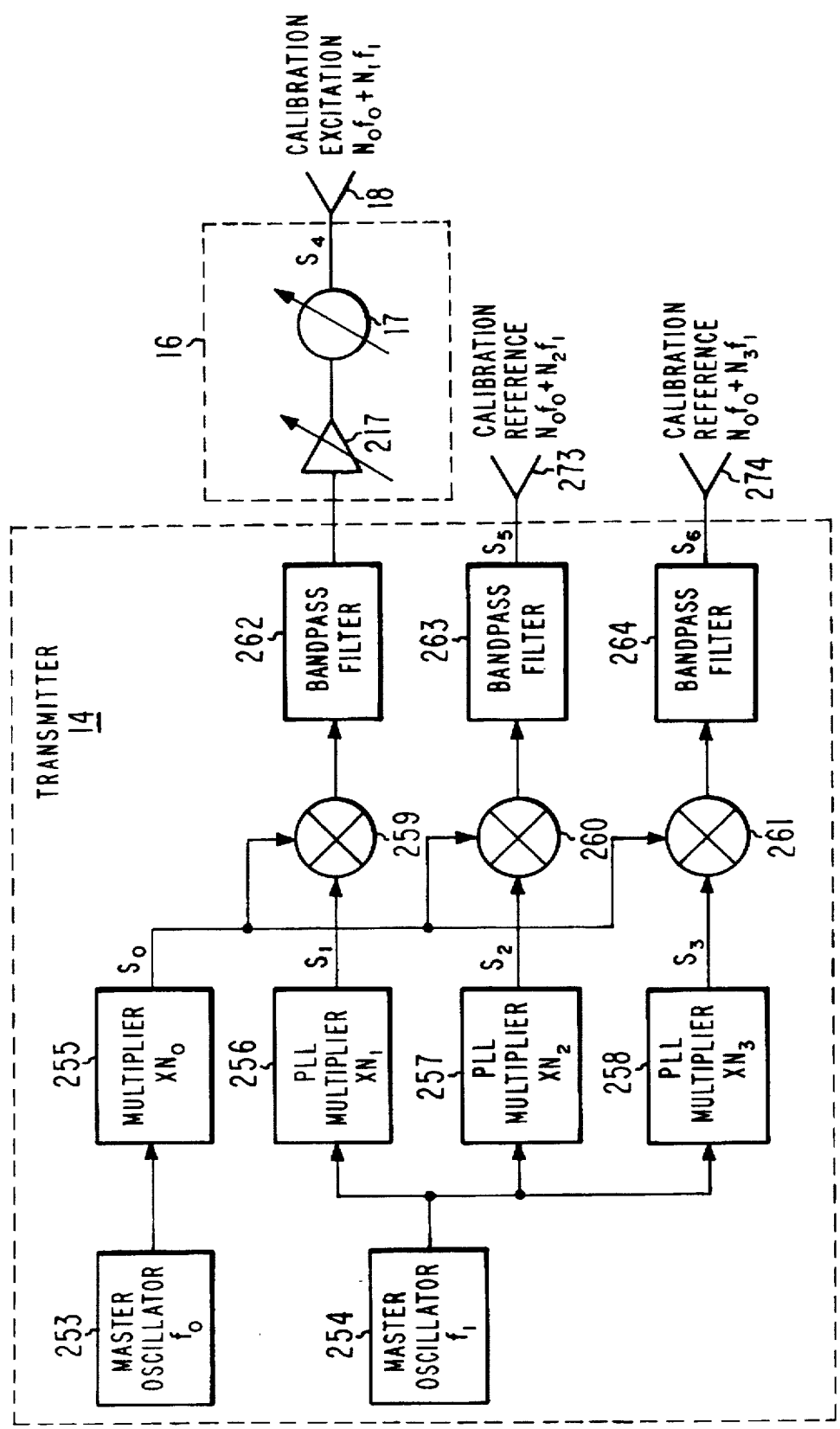

In accordance with an aspect of the invention, detection schemes using one and two reference tone signals are used. Such schemes are described in U.S. patent application Ser. No. 08/738,195, filed Oct. 25, 1996 in the name of Ashe et al., and entitled COHERENT DETECTION ARCHITECTURE FOR REMOTE CALIBRATION OF COHERENT SYSTEMS. As described therein, and as illustrated in FIG. 2, the transmitter 14 of spacecraft 10 of FIG. 1a includes a master source or oscillator 253 for generating a frequency $f_0$, and a second master oscillator 254, which generates a frequency $f_1$. The frequency $f_0$ from oscillator 253 is applied to a multiplying phase-lock loop (PLL) 255, in which frequency $f_0$ is multiplied by $N_0$, which is a constant integer, to produce a signal designated $S_0$. Signal $S_0$ is applied to the first input ports of three multipliers 259, 260, and 261. The $f_1$ signal from oscillator 254 is applied to the input ports of PLL frequency multipliers 256, 257, and 258, which are arranged to multiply the frequency $f_1$ by $N_1$, $N_2$, and $N_3$, respectively, to form signals $S_1$, $S_2$, and $S_3$, respectively, where $N_1$, $N_2$, and $N_3$ are integers, chosen so that twice $N_2$ equals $N_1$ plus $N_3$. The frequency-multiplied signals $S_1$, $S_2$, and $S_3$ are applied to second input ports of multipliers 259, 260, and 261, respectively, for multiplication by signal $S_0$ applied to their first input ports. The output signals from multipliers 259, 260, and 261 are at the sum and difference frequencies of their respective input frequencies. The signals from multipliers 259, 260, and 261 are applied to bandpass filters 262, 263, and 264, respectively, for removing the difference frequencies, leaving only the sum frequencies. The filtered signals from filters 262 are applied to the beamformer 16, for phase-shifting the signals by means of array 17 of phase shifters, and for tapering the amplitude, if necessary, by means of an array of attenuators or variable gain devices, illustrated as a single variable gain element 217. The signals processed by beamformer 16 are applied to the various elements of antenna array 18, to produce a signal designated $S_4$ for transmission to the ground station 12 of FIG. 1a as the pulses which allow determination of the error in the orientation or attitude of the array.

The signals from bandpass filters 263 and 264 of FIG. 2 are designated $S_5$ and $S_6$, respectively, and they are applied to an antenna set 273, 274, which is different from the antenna array 18 in that it is invariant with time. Antennas 273 and 274 may be individual antennas of the broad-beam or (nominally) omnidirectional type, such as beacon antennas. While antennas 273 and 274 are illustrated as being separate, they may be combined into one.

Figure 3:
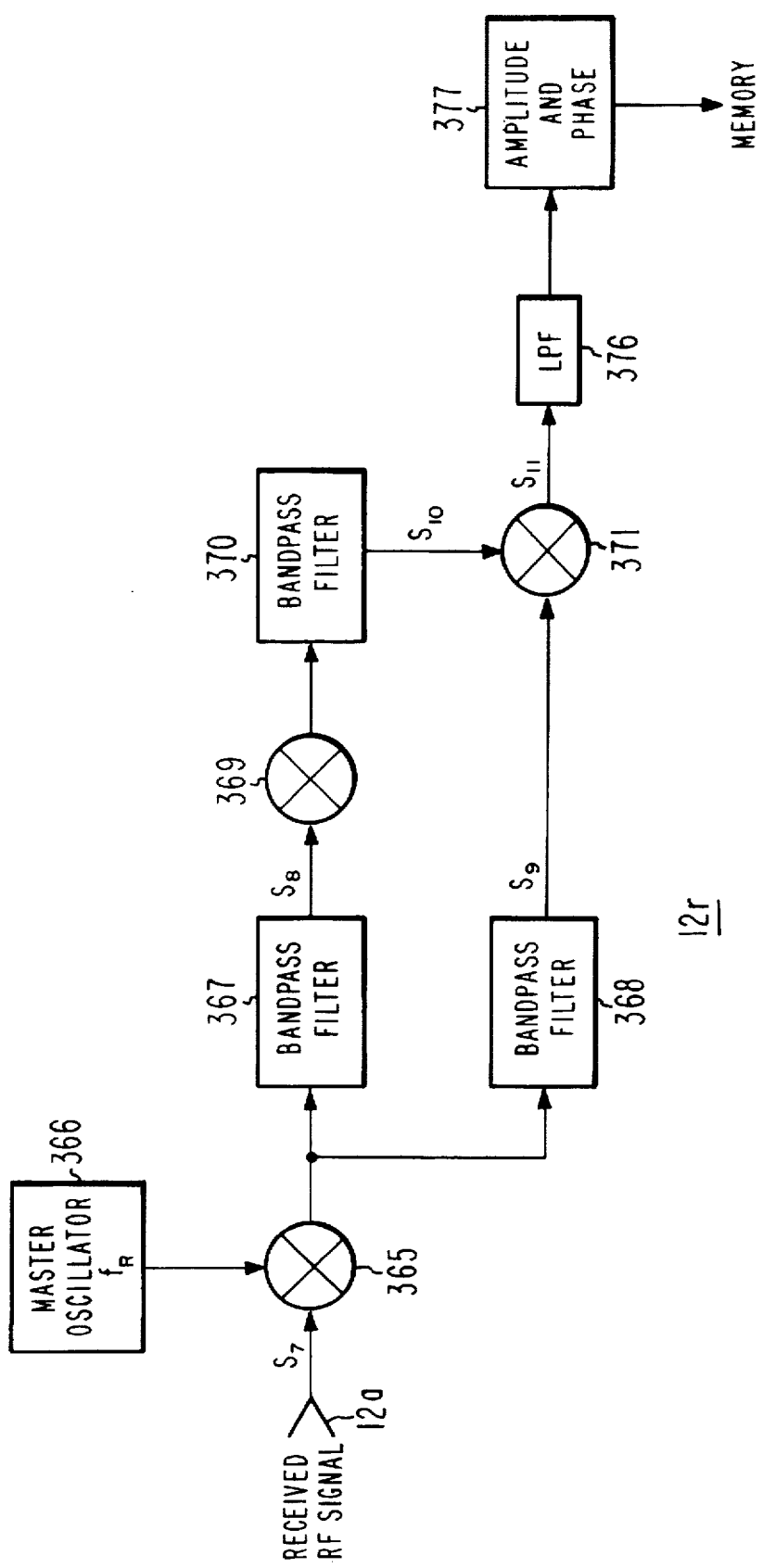

FIG. 3 is a simplified block diagram of a receiver 12r, which may be located at the receiver ground station 12 of FIG. 1a, for receiving the signals transmitted from the spacecraft by the transmitter 14 of FIG. 2. In FIG. 3, all three of the signals are received by antenna 12a as a signal $S_7$, and they are applied to a first input port of a multiplier 365, in which signals $S_7$ are multiplied by a signal at a frequency $f_R$ from a master oscillator 366. Master oscillator 366 is at a frequency which is intended to be equal to the frequency of signal $S_o$ of FIG. 2, but which may differ therefrom by reason of unavoidable inaccuracies, and because of Doppler motion of the spacecraft relative to the Earth station. The resulting signal at the output of multiplier 365 includes signals at the sum and difference frequencies between $f_R$ and each of the three input signals applied to the first input port of multiplier 365. The sum and difference frequencies are applied to the input ports of bandpass filters 367 and 368, for removing the sum frequencies and passing the difference frequencies. Bandpass filter 367 passes the two "reference" signals $S_8$ transmitted by the time-invariant antennas 273, 274, and removes the time-variant signal. Bandpass filter 368 passes the time-variant "test" signals $S_9$, and removes the time-invariant signals. The reference signals $S_8$ are applied to a nonlinear device illustrated as a multiplier 369, for generating signals which are at harmonic frequencies and at intermodulation frequencies of the two reference signals. The multiplied signals are applied from device 369 to a bandpass filter 370, where the signal at about a frequency of twice the frequency of $S_5$ minus the frequency of signal $S_6$ is passed, and all other signals are blocked or removed. The reason for the use of the term "about" is because of the differences between the frequency of the master oscillator 366 and signal $S_0$, referred to above. The signal at the output of bandpass filter 370 is designated $S_{10}$.

Signal $S_{10}$ from filter 370 of FIG. 3 is applied to a first input port of a quadrature multiplier 371, and signal $S_9$ from filter 368 is applied to a second input port of the multiplier. Quadrature multiplier 371 has two output ports, at which inphase and quadrature output signals, designated together as $S_{11}$, are produced. The sums and differences occur, and the differences are passed by a low-pass filter 376. The difference frequencies from filter 376 are applied to an amplitude and phase estimator illustrated as a block 377, which determines the amplitude and phase of the test signal $S_9$ relative to the reference signal $S_{10}$. According to an aspect of the invention, this information is saved after transmission of each of the first, second, and third pulses, as described below.

Figure 4:
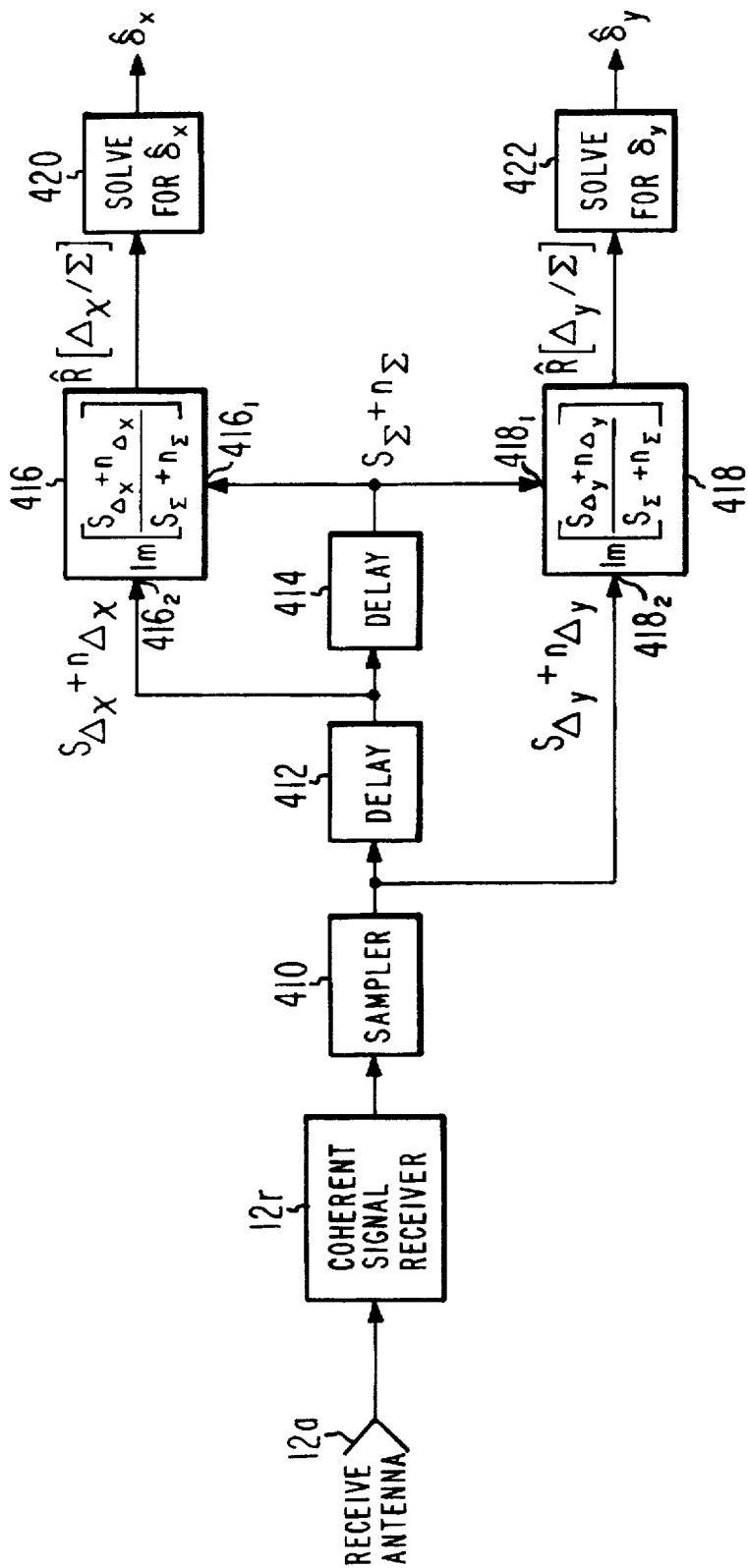
FIG. 4 is a simplified diagram, in block and schematic form, illustrating processing according to the invention in addition to the processing described in conjunction with FIG. 3.

FIG. 4 is a simplified block diagram illustrating the processing of FIG. 3 as a block 12r, and also illustrating additional processing according to an aspect of the invention. In FIG. 4, the information relating to the amplitude and phase of the test signal $S_9$ relative to the reference signal $S_{10}$ is outputted from block 12r after transmission of each of the three pulses (or pulse sets) in accordance with the invention. As mentioned, the difference between the pulses of the sets lies in the phase of the phase-shifters of the antenna array during the transmission; the first pulse has the phase shifters in their reference state, the second pulse has half the phase shifters about one axis of symmetry of the antenna shifted by $\pi$ or 180°, and the third pulse has half the phase shifters about the other axis of symmetry phase shifted by $\pi$.

The information produced at the output of coherent processor 12r of FIG. 4 is applied to a sample-and-hold or sampler 410, which waits until the processing is completed in coherent receiver 12r after each pulse set is processed, and ultimately couples the resulting information to a delay or memory 412. Memory 412 store the information until a later time, at which the information is transmitted or transferred to a further memory or delay 414. After the transmission of pulses corresponding to a sum beam, and to first and second difference beams, delay 414 contains information relating to the sum beam, delay 412 contains information relating to the first difference beam, and sample-and-hold 410 contains information relating to the second difference beam. The information (amplitude and phase) then stored in delay 414 is transferred to first input ports $416_1$ and $418_1$ of processors 416 and 418, the information stored in delay 412 is transferred to a second input port $416_2$ of processor 416, and the information stored in sample-and-hold 410 is transferred to a second input port $418_2$ of processor 418. Processors 416 and 418 take the ratios of the amplitudes of the second-port signals relative to the first-port signals, and the difference of the phase (second port phase minus first port phase).

$$R_x 3m|\hat{S}_{\Delta x}/\hat{S}_{\Sigma}| \quad\quad\quad 1$$

$$R_y 3m|\hat{S}_{\Delta y}/\hat{S}_{\Sigma}| \quad\quad\quad 2$$

where $\hat{S}_{\Delta x}$ and $\hat{S}_{\Delta y}$ are the measured values of the delta beams, and $\hat{S}_{\Sigma}$ is the measured value of the sum beam. All of the measured values are contaminated to some degree by noise signals occurring in the measurement process.

The combination of the amplitude and phase information is an error signal. The error signal from processor 416 is applied to a further block 420, for determining the projection $\delta_x$ of the vector 26e onto x coordinate axis of the array. Similarly, the signals applied to block 422 are processed to determine the projection $\delta_y$ of the vector 26e onto the y coordinate of the array, where the x and y coordinates of the array correspond to the axes of symmetry 22 and 24. The angular coordinates of the ground station 12 for the phased array satellite are characterized in spherical polar coordinates by R, θ, φ. Here theta (θ) and phi (φ) are the polar and azimuthal angles, respectively. The elevation angle is equal to ($\pi/2-\theta$), and the center of the array is designated as the origin of the coordinate system. The projections of the vector R from the array center to the target (the ground station) onto the Cartesian coordinate system are defined by $$T_x = \sin \theta \cos \phi \quad\quad\quad 3$$

$$T_y = \sin \theta \sin \phi \quad\quad\quad 4$$

$$T_z \cos \theta \quad\quad\quad 5$$

The estimated errors in the values of these projections, $$\delta_x = T_x - T_{x0} \quad\quad\quad 6$$

$$\delta_y = T_y - T_{y0} \quad\quad\quad 7$$

may be derived from a look-up table implementing $$R_x = \frac{2\sin^2(XN_x/4)}{\sin(XN_x/2)} \quad\quad\quad 8$$

$$R_y = \frac{2\sin^2(YN_y/4)}{\sin(YN_y/2)} \quad\quad\quad 9$$

where $$X = 2\pi \frac{\Delta_x}{\lambda} (T_x - T_{x0}) \quad\quad\quad 10$$

and $$Y = 2\pi \frac{\Delta_y}{\lambda} (T_y - T_{y0}) \quad\quad\quad 11$$

Figure 5:
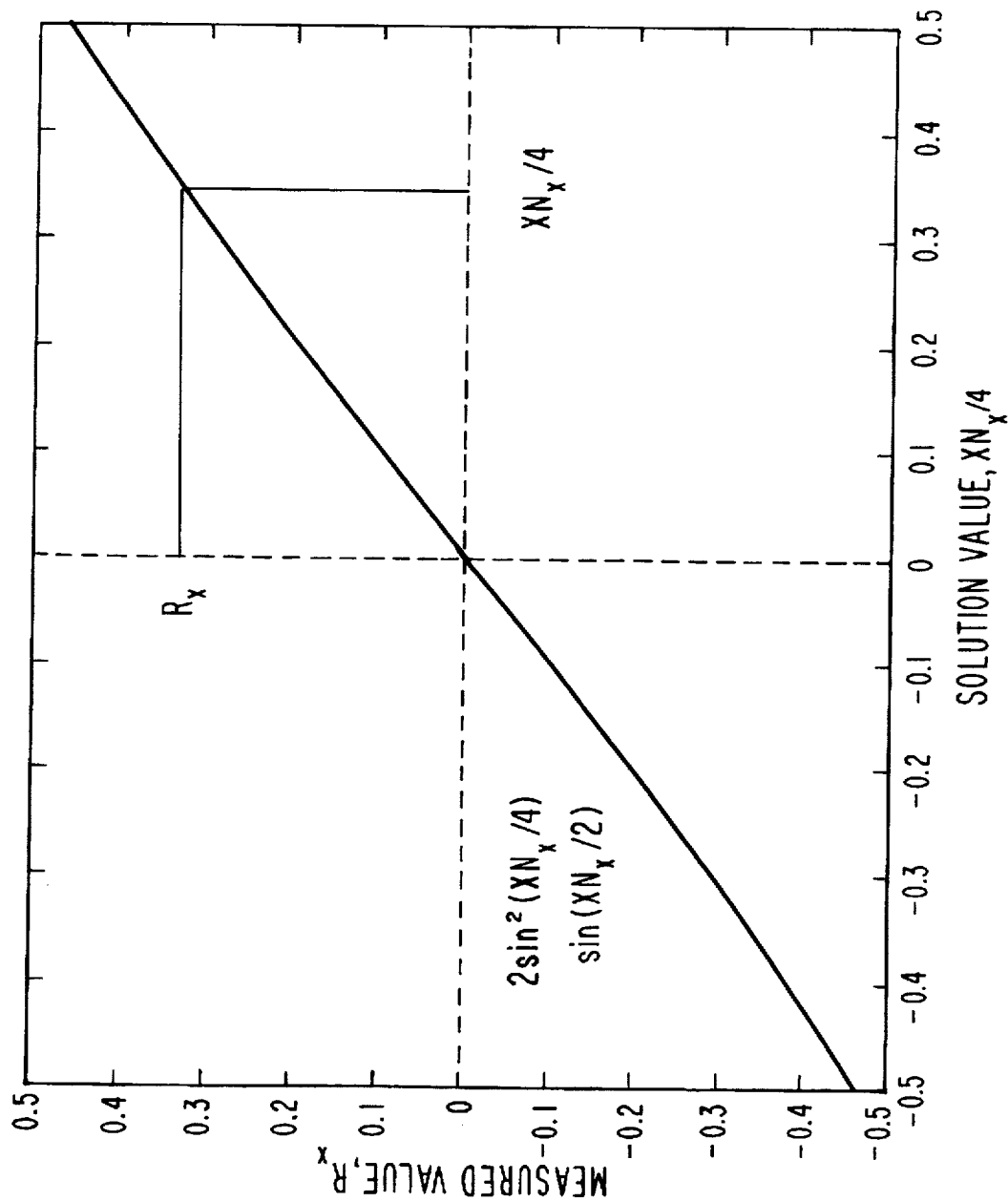
FIG. 5 is a plot which represents implementation of certain equations in a lookup table.

The RF wavelength is $\lambda$, and the $\Delta_x$, $\Delta_y$ are the array interelement separations in the x, y directions, respectively. The contents of the lookup table are represented in the plot of FIG. 5, in which the chart converts the ratio input into the multiplier output.

Figure 6:
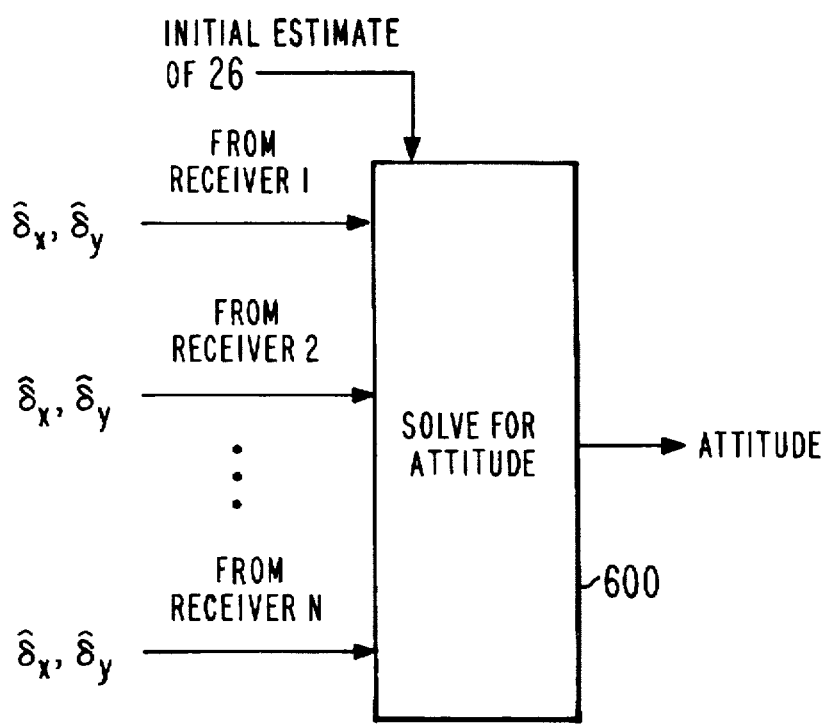
FIG. 6 is a simplified block diagram representing the processing for determination of the complete attitude of the phased array 18 of FIG. 1 based on measurements made in respect of a plurality of ground stations.

Referring once again to FIG. 1a, a further or second ground station 612 has so far not been described, since the method according to the aspect of the invention, as described in conjunction with FIGS. 1–5 (where the hyphen represents the word "through"), relates to measurements made at a single ground station, namely ground station 12. According to another aspect of the invention, measurements similar to those made at ground station 12 can also be made at (or for) additional ground station 612. The additional measurements made at ground station 612 are identical to those made at ground station 12, and ultimately result in an array of error signals $\delta_x$ and $\delta_y$, representing the difference between the estimated direction $T_{x0}$, $T_{y0}$, (direction 26) of each ground station (12 and 612, in the example of two ground stations) and the actual direction $T_x$, $T_y$ (direction 26') of the ground station as seen from the spacecraft. Thus, there is one set of vector components $T_x$, $T_{x0}$; $T_y$, $T_{y0}$ for each ground station. In order to differentiate among the vector component sets, they are distinguished by an additional parenthetical numeral, representing the ground station index. Thus, vector component set $T_x(1)$; $T_{x0}(1)$; $T_y(1)$; $T_{y0}(1)$ refers to the components associated with ground station 12 of FIG. 1a, and $T_x(2)$; $T_{x0}(2)$, $T_y(1)$; $T_{y0}(2)$ refer to the components associated with ground station 612, etc. These additional error signals, and further error signals from other ground stations (not illustrated) may be viewed as being applied to a processor 600 of FIG. 6.

Figure 7:
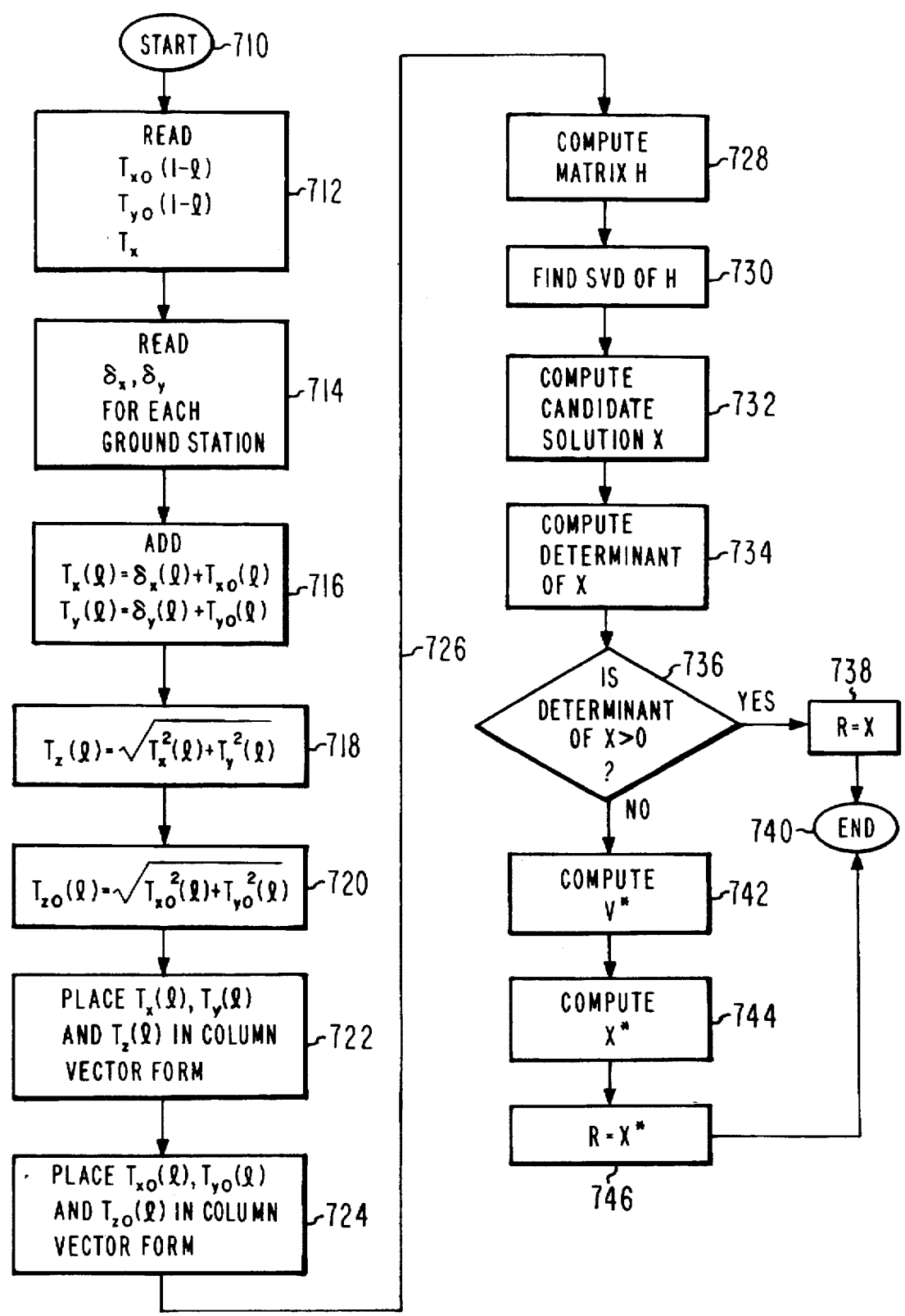
FIG. 7 is a flow chart representing the logic flow in calculating the attitude from the measurements at multiple ground stations.

FIG. 7 is a simplified flow chart illustrating the principal logic steps in determining the attitude of the phased-array antenna 18 of FIG. 1a. In FIG. 7, the logic starts at a START block 710, and flows to a block 712, which represents reading of $T_{x0}(1-1)$ for all the ground stations one through 1. Block 712 also represents the reading of $T_{y0}(1-1)$. From logic block 712, the logic flows to a further block 714, which represents reading of $\delta_x$ and $\delta_y$ for each ground station. In order to determine the true direction (26') of the ground station from the spacecraft, the error 26e of FIG. 1a must be added to the estimated direction 26 for each ground station. This is accomplished by adding $\delta_x$ to $T_{x0}$ to get $T_x$, and by adding $\delta_y$ to $T_{y0}$ to get $T_y$, for each of the ground stations, as suggested by block 716 of FIG. 7.

The two components $T_x$, and $T_y$ in combination completely define the vectors 26' for each ground station, since they lack a Z vector component. The Z vector component is determined by squaring the $T_x$ and $T_y$ components in a block 718 of FIG. 7, and taking the square root of the sum of the squares. This process is performed for each ground station, to provide $T_z$ for each ground station. Similarly, the two components $T_{x0}$ and $T_{y0}$ in combination completely define the vectors 26 for each ground station, but we must also find the Z vector component. The Z vector component is determined in block 720 by squaring the $T_{x0}$ and $T_{y0}$ components, and taking the square root of the sum of the squares. This process is performed for each ground station, to provide $T_{z0}$.

In order to complete the calculation of the attitude of the local coordinate system of the phased-array antenna relative to the nominal coordinate frame from which the initial coarse estimates of the receiver orientation were derived. The rotation matrix is calculated in block 722 of FIG. 7 by combining $T_x$, $T_y$, and $T_z$ into a column vector T, and this is done for each ground station. Similarly, block 724 represents the forming of $T_{x0}$, $T_{y0}$, and $T_{z0}$ into a column vector $T_0$ for each ground station. Next, a matrix H, which is merely an intermediate, is calculated, as suggested by block 728 of the flow chart of FIG. 7. Matrix H is defined as $$\underline{H} = \sum_{l=1}^{N} \underline{T}(l)\underline{T_0}^T(l) \qquad 12$$

where
the parenthetical "l" is an index identifying the particular ground station;
N represents the number of ground stations (two in the example); and
the superscript T represents the transpose operation.

Having determined the value of matrix H, the next step, in the flow of FIG. 7, is to compute the singular value decomposition (SVD) of matrix H, as suggested by block 730.

$$H = U \underline{\Lambda} V^T \qquad 13$$

By definition of the SVD, U and V are third order orthonormal matrices, and $\Lambda$ is a third order diagonal matrix of singular values. Block 732 represents the next step, which is to construct a candidate solution X $$X = V U^T \qquad 14$$

When the candidate solution X is constructed, the logic of FIG. 7 flows to a further block 734, which represents computation of the determinant of candidate solution X, in order aid in determining if the orthonormal matrix X is a pure rotation. The logic then flows to a decision block 736, in which the value of the determinant is compared with zero. If the determinant is greater than zero, the logic exits decision block 736 by the YES output path, and arrives at a block 738, which represents the setting of rotation matrix R to be equal to X. The desired rotation matrix R is thus determined.

On the other hand, if the value of the determinant computed in block 734, when compared with zero in decision block 736, is found to be either zero or less than zero, the logic exits decision block 736 by the NO output, and arrives at a further block 742. Block 742 represents computation of V*, where V* is simply V with the sign of the third column reversed or changed.

From block 742, the logic flows to a block 744, which represents calculation of $$X^* = V^* U^T \qquad 15$$

It should be noted that the computations of blocks 728–746 of the flow chart of FIG. 7 sets forth calculations which are described in an article entitled "Least-squares fitting of two 3-d point sets", by Arun et al., published at pp 698–700 of IEEE Transactions on Pattern Analysis and Machine Intelligence, Vol 9, No 5, September 1987.

The rotation matrix R represents the attitude of the local coordinate system of the phased-array antenna relative to the coordinate frame of the remote receivers.

Thus, a method according to the invention determines, from measurements made at a remote first receiver (12), at least the orientation of the boresight axis (20) of a remote phased-array antenna (18). For this purpose, the term "orientation" means the angular location (26) of the receiver (12) relative to the coordinates (20, 22, 24) of the phased-array antenna (18). In a particular embodiment of the invention, the phased-array antenna (18) is located on an aerospace vehicle such as an aircraft or a spacecraft (10), and the first receiver is located at a terrestrial ground station (12). The phased-array antenna (18) has first (22) and second (24) axes of symmetry which are mutually orthogonal, and orthogonal to the boresight (20). The antenna array (18) includes a plurality of individual antenna elements (18a, 18b, 18c, ...., 18d), and also includes, or is associated with, a beamformer (16), which may be capable of controlling the amplitude and which, by way of an array (17) of phase-shifters (16a, 16b, 16c, ...., 16d), individually controls the phases of the signals applied to the various antenna elements (16a, 16b, 16c, ...., 16d). The method according to the invention includes a plurality of steps. The steps include estimating the orientation ($T_{x0}$, $T_{y0}$) of the first receiver (12) relative to the local coordinate system of the phased-array antenna (18), which estimate may be derived, for example, from knowledge of the vehicle attitude and the physical orientation of the antenna on the vehicle. The phase shifters (17) of the beamformer (16) are set to three different conditions ($\Sigma$, $\Delta_1$, $\Delta_2$ beams) when the method is performed; these settings may be made in time sequence. The phase shifters of the beamformer are set to a first sum-beam condition which provides a planar wavefront having a normal directed toward the estimated location of the first receiver. With the phase shifters set to the first sum-beam condition, at least a first pulse signal is transmitted toward the first receiver. The pulse signal may be a pulse set, if desired. The phase shifters of the beamformer are set to a first delta-beam condition, in which the phase shifters (16a, 16b, 16c) associated with those of the antenna elements (18a, 18b, 18c) on a first side (to the left in FIG. 1a) of the first axis of symmetry (22) have the first sum-beam phase-shift or condition, and those of the phase shifters (16d) associated with those of the antenna elements (18d) on a second side (to the right in FIG. 1a) of the first axis of symmetry (22) have the first sum-beam phase-shift or condition plus 180°. With the phase shifters of beamformer set to the first delta-beam condition, at least a second pulse signal is transmitted toward the first receiver (12). The phase shifters (17) of the beamformer (16) are set to a second delta-beam condition, in which the phase shifters (16a) associated with those of the antenna elements (18a) on a first side (the rear side in FIG. 1a) of the second axis of symmetry (24) have the first sum-beam phase-shift or condition, and those of the phase shifters (16b, 16c, 16d) associated with those of the antenna elements (18b, 18c, 18d) on a second side (near side in FIG. 1a) of the second axis of symmetry (24) have the first sum-beam phase shift or condition, plus 180°. With the phase shifters of the beamformer set to the second delta-beam condition, at least a third pulse signal is transmitted toward the first receiver (12). The first pulse signal is received at the first receiver, and the amplitude and phase of the first pulse signal are extracted, relative to a reference signal.

The reference signal may be derived from any one of the first, second and third pulse signals. The second pulse signal is received at the first receiver, and the amplitude and phase of the second pulse signal are extracted relative to the reference signal. The third pulse signal is received at the first receiver, and the amplitude and phase of the third pulse signal are extracted relative to the reference signal. A first ratio is formed representing the ratio of the complex amplitude of the first delta beam divided by the first sum beam. A second ratio is formed representing the ratio of the complex amplitude of the second delta beam divided by the first sum beam.

From the first and second ratios, the error in the initial estimate of the orientation of the receiver is determined, relative to a boresight of the phased-array antenna. This error in the initial estimate, together with the initial estimate of the position of the first receiver relative to the local coordinate system, allows determination of a refined estimate of the actual orientation of the receiver relative to the boresight of the phased-array antenna.

In a particular embodiment of the invention, the above-described method is enhanced by further steps, which allow the determination of the full attitude of the phased-array antenna relative. These further steps include estimating the orientation of a second receiver, at a different location than the first receiver, relative to the local coordinate system of the phased-array antenna. The phase shifters of the beamformer are set to an second sum-beam condition which provides a planar wavefront having a normal directed toward the second receiver, based on the estimate of the location of the second receiver. With the phase shifters set to the second sum-beam condition, at least a fourth pulse signal is transmitted toward the second receiver. The phase shifters of the beamformer are set to a third delta-beam condition.

The third delta-beam condition is one in which the phase shifters associated with those of the antenna elements on the first side of the first axis of symmetry have the second sum-beam condition or phase-shift, and those of the phase shifters associated with those of the antenna elements on a second side of the first axis of symmetry have the second sum-beam condition or phase shift, plus 180°. With the phase shifters of beamformer set to the third delta-beam condition or phase-shift, at least a fifth pulse signal is transmitted toward the second receiver. The phase shifters of the beamformer are set to a fourth delta-beam condition, in which the phase shifters associated with those of the antenna elements on a first side of the second axis of symmetry have the second sum-beam phase-shift or condition, and those of the phase shifters associated with those of the antenna elements on the other or second side of the second axis of symmetry have the second sum-beam condition or phase shift, plus 180°. With the phase shifters of beamformer set to the fourth condition, at least a sixth pulse signal is transmitted toward the second receiver. The fourth pulse signal is received at the second receiver, and the amplitude and phase of the fourth pulse signal are extracted relative to a second reference signal. The second reference signal may be derived from one of the fourth, fifth, or sixth pulse signals. The fifth pulse signal is received at the second receiver, and the amplitude and phase of the fifth pulse signal are extracted relative to the second reference signal. The sixth pulse signal is received at the second receiver, and the amplitude and phase of the sixth pulse signal are extracted relative to the second reference signal. A third ratio is formed, representing the ratio of the complex amplitude of the third delta beam to the second sum beam. A fourth ratio is formed, representing the ratio of the complex amplitude of the fourth delta beam to the second sum beam. From the third and fourth ratios, the error in the initial estimate of the orientation of the second receiver relative to a the local coordinate system of the phased-array antenna is determined. Then, from the known locations of the first and second receivers in a coordinate frame, and from the known errors in the initial estimates of the orientation of the first and second receivers relative to the local coordinate system, the three-dimensional position or attitude of the antenna array is determined relative to the coordinate frame of the receivers. For this purpose, the term "attitude" is the orientation of the antenna array coordinate system relative to an inertial frame of reference or to the roll, pitch, and yaw axes, as defined for spacecraft in Earth-bound orbits. The definition of "attitude" differs from the definition of "orientation" in that orientation refers to angular position relative to the "plane" of the antenna array, recognizing that an antenna array may, in some situations, not be exactly planar.

Other embodiments of the invention will be apparent to those skilled in the art. For example, if the antenna array includes an odd number of antenna elements in one direction, so that a line of elements lies on an axis of symmetry, those elements lying on the axis of symmetry are not energized during the transmission of the three-pulse set, and the measurements are made ignoring those elements on the axis or axes of symmetry. The spacecraft may include antennas other than the antenna array to which the invention is applied, such as, for example, telemetry antennas and the like, for receiving control instructions from a ground station. A control loop may be formed for control of the antenna array beam(s) positions, by determining the actual beam pointing direction using the method of the invention, and by transmitting appropriate phase-shift control information to the spacecraft to re-set the beam(s) in the selected direction.

Instead of, or in addition to, additional antennas, the antenna array to which the invention is applied may be used in both transmitting and receiving modes, if desired; this may be accomplished in a time-division multiplex manner, or by frequency multiplexing, or the like. If the array antenna degrades because of failure of one or more of the array elements, the signal-to-noise ratio of the received signals may be degraded, but this can be made up by increased integrating time. While a specialized coherent transmitter-receiver has been described in conjunction with FIGS. 2 and 3, a conventional coherent receiver using a phase-lock loop to lock onto the phase of the first-transmitted one of the pulses should be satisfactory in those cases in which Doppler-related phase shifts are not large, as might be the case for operation at low frequencies.

While the arrangements of FIG. 11a has each phase shifter coupled to one antenna element, it is well known to connect a set of multiple antenna elements to a single phase shifter, which, for purposes of the present invention, makes the set the equivalent of an element of the antenna array 18. There is no limitation, of course, on the type of antenna which may be included within an "antenna element" for purposes of the invention; dipoles, crossed dipoles, spirals, helices, cones, yagis and the like each have their own characteristics, which may be advantageous for particular applications.

What is claimed is:

1. A method for determining, from measurements made at a remote receiver, at least the orientation of a remote receiver relative to the local coordinate system of a remote phased-array antenna, said phased-array antenna having first and second mutually orthogonal axes of symmetry, said antenna including a plurality of individual antenna elements, and also including a beamformer with phase shifters capable of controlling the phase of the signals applied to the various individual antenna elements, said method comprising the steps of:

estimating the orienation of said receiver relative to the local coordinate system of said phased-array antenna;

setting said phase shifters of said beamformer to a sum-beam phase condition which provides a planar wavefront having a normal directed toward said receiver, based on said estimate of the orientation of said receiver;

with said phase shifters set to said first condition, transmitting at least a first pulse signal toward said receiver;

setting said phase shifters of said beamformer to a first delta-beam phase condition, said first delta-beam condition being one in which said phase shifters associated with those of said antenna elements on a first side of said first axis of symmetry have said reference condition, and those of said phase shifters associated with those of said antenna elements on a second side of said first axis of symmetry have said reference phase shift plus 180°;

with said phase shifters of said beamformer set to said first delta-beam condition, transmitting at least a second pulse signal toward said receiver;

setting said phase shifters of said beamformer to a second delta-beam condition, said third condition being one in which said phase shifters associated with those of said antenna elements on a first side of said second axis of symmetry have said reference condition, and those of said phase shifters associated with those of said antenna elements on a second side of said second axis of symmetry have said reference phase shift plus 180°;

with said phase shifters of beamformer set to said second delta beam condition, transmitting at least a third pulse signal toward said receiver;

receiving said first pulse signal at said receiver, and extracting amplitude and phase of said first pulse signal relative to a reference signal, which may be derived from one of said first, second and third pulse signals;

receiving said second pulse signal at said receiver, and extracting amplitude and phase of said second pulse signal relative to said reference signal;

receiving said third pulse signal at said receiver, and extracting amplitude and phase of said third pulse signal relative to said reference signal;

forming a first ratio of the complex amplitude of said first delta beam to said sum beam;

forming a second ratio of the complex amplitude of said second delta beam to said sum beam;

from said first and second ratios, determining the error in said initial estimate of said orientation of said receiver relative to said local coordinate system of said phased-array antenna.

2. A method according to claim 1, further comprising the steps of:

from said error and said initial estimate of said orientation of said receiver, determining a refined estimate of the actual orientation of said receiver relative to said local coordinate system of said phased-array antenna.

3. A method according to claim 1, further comprising the steps of:

estimating the orientation of a second receiver, at a different location than said first receiver, relative to said local coordinate system of said phased-array antenna;

setting said phase shifters of said beamformer to an second sum-beam condition which provides a planar wavefront having a normal directed toward said second receiver, based on said estimate of the location of said second receiver;

with said phase shifters set to said second sum-beam condition, transmitting at least a fourth pulse signal toward said second receiver;

setting said phase shifters of said beamformer to a third delta-beam condition, said third delta-beam condition being one in which said phase shifters associated with those of said antenna elements on a first side of said first axis of symmetry have said second reference condition, and those of said phase shifters associated with those of said antenna elements on a second side of said first axis of symmetry have said second reference phase shift plus 180°;

with said phase shifters of said beamformer set to said third delta-beam condition, transmitting at least a fifth pulse signal toward said second receiver;

setting said phase shifters of said beamformer to a fourth delta-beam condition, said fourth condition being one in which said phase shifters associated with those of said antenna elements on a first side of said second axis of symmetry have said second reference condition, and those of said phase shifters associated with those of said antenna elements on a second side of said second axis of symmetry have said second reference phase shift plus 180°;

with said phase shifters of said beamformer set to said fourth delta beam condition, transmitting at least a sixth pulse signal toward said receiver;

receiving said fourth pulse signal at said receiver, and extracting amplitude and phase of said fourth pulse signal relative to second a reference signal, which may be derived from one of said fourth, fifth, or sixth pulse signals;

receiving said fifth pulse signal at said receiver, and extracting amplitude and phase of said fifth pulse signal relative to said second reference signal;

receiving said sixth pulse signal at said receiver, and extracting amplitude and phase of said sixth pulse signal relative to said second reference signal;

forming a third ratio of the complex amplitude of said third delta beam to said second sum beam;

forming a fourth ratio of the complex amplitude of said fourth delta beam to said second sum beam;

from said third and fourth ratios, determining the error in said initial estimate of said orientation of said second receiver relative to said local coordinate system of said phased-array antenna; and from said known locations of said first and second receivers in a coordinate frame, and from said initial estimates, and from said known errors in said initial estimates of said orientation of said first and second receivers relative to said local coordinate system, determining the attitude of said local coordinate system relative to said coordinate frame.

4. A method for determining, from measurements made at a first Earth-based receiver, at least the orientation of the boresight axis of an aerospace-vehicle-borne remote phased-array antenna, said phased-array antenna having first and second mutually orthogonal axes of symmetry, said antenna including a plurality of individual antenna elements, and also including a beamformer capable of controlling the phase of the signals applied to the various individual antenna elements, said method comprising the steps of:

estimating the orientation of said receiver relative to a boresight of said phased-array antenna;

setting said phase shifters of said beamformer to a first sum-beam condition which provides a planar wavefront having a normal directed toward said receiver, based on said estimate of the location of said receiver;

with said phase shifters set to said first sum-beam condition, transmitting at least a first pulse signal toward said receiver;

setting said phase shifters of said beamformer to a first delta-beam condition, said first delta-beam condition being one in which said phase shifters associated with those of said antenna elements on a first side of said first axis of symmetry have said first sum-beam phase shift, and those of said phase shifters associated with those of said antenna elements on a second side of said first axis of symmetry have said first sum-beam phase shift plus 180°;

with said phase shifters of beamformer set to said first delta-beam condition, transmitting at least a second pulse signal toward said receiver;

setting said phase shifters of said beamformer to a second delta-beam condition, said second delta-beam condition being one in which said phase shifters associated with those of said antenna elements on a first side of said second axis of symmetry have said first sum-beam phase shift, and those of said phase shifters associated with those of said antenna elements on a second side of said second axis of symmetry have said first sum-beam phase shift plus 180°;

with said phase shifters of beamformer set to said second delta-beam condition, transmitting at least a third pulse signal toward said receiver;

receiving said first pulse signal at said receiver, and extracting amplitude and phase of said first pulse signal relative to a reference signal, which may be derived from one of said first, second and third pulse signals;

receiving said second pulse signal at said receiver, and extracting amplitude and phase of said second pulse signal relative to said reference signal;

receiving said third pulse signal at said receiver, and extracting amplitude and phase of said third pulse signal relative to said reference signal;

forming a first ratio of the complex amplitude of said first delta beam to said first sum beam;

forming a second ratio of the complex amplitude of said second delta beam to said first sum beam;

from said first and second ratios, determining the error in said initial estimate of said orientation of said first receiver relative to said boresight of said phased-array antenna.

5. A method according to claim 4, further comprising the steps of:

from said error and said initial estimate of said orientation of said first receiver, determining a refined estimate of the actual orientation of said receiver relative to said boresight of said phased-array antenna.

6. A method according to claim 4, further comprising the steps of:

estimating the orientation of a second terrestrial receiver, at a different location than said first receiver, relative to said boresight of said phased-array antenna;

setting said phase shifters of said beamformer to an second sum-beam condition which provides a planar wavefront having a normal directed toward said second receiver, based on said estimate of the location of said second receiver;

with said phase shifters set to said second sum-beam condition, transmitting at least a fourth pulse signal toward said second receiver;

setting said phase shifters of said beamformer to a third delta-beam condition, said third delta-beam condition being one in which said phase shifters associated with those of said antenna elements on said first side of said first axis of symmetry have said second sum-beam phase-shift, and those of said phase shifters associated with those of said antenna elements on said second side of said first axis of symmetry have said second sum-beam phase-shift plus 180°;

with said phase shifters of beamformer set to said third delta-beam condition, transmitting at least a fifth pulse signal toward said second receiver;

setting said phase shifters of said beamformer to a fourth delta-beam condition, said fourth delta-beam condition being one in which said phase shifters associated with those of said antenna elements on said first side of said second axis of symmetry have said second sum-beam phase-shift condition, and those of said phase shifters associated with those of said antenna elements on said second side of said second axis of symmetry have said second sum-beam phase-shift condition plus 180°;

with said phase shifters of beamformer set to said fourth condition, transmitting at least a sixth pulse signal toward said receiver;

receiving said fourth pulse signal at said receiver, and extracting amplitude and phase of said fourth pulse signal relative to a reference signal, which may be derived from one of said fourth, fifth, or sixth pulse signals;

receiving said fifth pulse signal at said receiver, and extracting amplitude and phase of said fifth pulse signal relative to said second reference signal;

receiving said sixth pulse signal at said receiver, and extracting amplitude and phase of said sixth pulse signal relative to said second reference signal;

forming a third ratio of the complex amplitude of said third delta beam to said second sum beam;

forming a fourth ratio of the complex amplitude of said fourth delta beam to said second sum beam;

from said third and fourth ratios, determining the error in said initial estimate of said orientation of said second receiver relative to a boresight of said phased-array antenna; and from said known locations of said first and second terrestrial receivers, and from said known errors in said initial estimates of said orientation of said first and second receivers relative to said boresight, determining the attitude of said boresight relative to said coordinate frame.

* * * * *